United States Patent
Oshitari et al.

(10) Patent No.: US 9,780,372 B2
(45) Date of Patent: Oct. 3, 2017

(54) ELECTRODE MATERIAL FOR LITHIUM-ION RECHARGEABLE BATTERY

(71) Applicant: Sumitomo Osaka Cement Co., Ltd., Tokyo (JP)

(72) Inventors: Satoru Oshitari, Tokyo (JP); Masataka Oyama, Tokyo (JP); Ryuuta Yamaya, Tokyo (JP)

(73) Assignee: SUMITOMO OSAKA CEMENT CO., LTD. (JP)

( * ) Notice: Subject to any disclaimer, the term of this patent is extended or adjusted under 35 U.S.C. 154(b) by 0 days.

(21) Appl. No.: 15/075,636

(22) Filed: Mar. 21, 2016

(65) Prior Publication Data

US 2017/0092953 A1 Mar. 30, 2017

(30) Foreign Application Priority Data

Sep. 30, 2015 (JP) ................................. 2015-194167

(51) Int. Cl.
*H01M 4/58* (2010.01)
*H01M 4/136* (2010.01)
*H01M 4/36* (2006.01)
*H01M 4/583* (2010.01)
*H01M 4/62* (2006.01)
*H01M 4/66* (2006.01)
*H01M 2/16* (2006.01)
*H01M 4/04* (2006.01)
*H01M 4/1397* (2010.01)
*H01M 4/38* (2006.01)
*H01M 10/0525* (2010.01)
*H01M 10/0568* (2010.01)
*H01M 10/0569* (2010.01)
*H01M 4/02* (2006.01)

(52) U.S. Cl.
CPC ......... *H01M 4/5825* (2013.01); *H01M 4/136* (2013.01); *H01M 4/366* (2013.01); *H01M 4/583* (2013.01); *H01M 4/623* (2013.01); *H01M 4/625* (2013.01); *H01M 4/661* (2013.01); *H01M 2/162* (2013.01); *H01M 2/1653* (2013.01); *H01M 4/0404* (2013.01); *H01M 4/1397* (2013.01); *H01M 4/382* (2013.01); *H01M 10/0525* (2013.01); *H01M 10/0568* (2013.01); *H01M 10/0569* (2013.01); *H01M 2004/021* (2013.01); *H01M 2004/028* (2013.01); *H01M 2220/20* (2013.01); *H01M 2300/0037* (2013.01)

(58) Field of Classification Search
CPC .................................................... H01M 4/5825
USPC ........................................................... 429/221
See application file for complete search history.

(56) References Cited

U.S. PATENT DOCUMENTS

2010/0261063 A1* 10/2010 Kitagawa ............... C01B 25/37
429/232
2013/0140496 A1 6/2013 Nuspl et al.
2014/0356720 A1 12/2014 Nuspl et al.

FOREIGN PATENT DOCUMENTS

| JP | A-2003-520405 | 7/2003 |
|---|---|---|
| JP | 2013101883 A | 5/2013 |
| JP | 2013518023 A | 5/2013 |
| JP | 2013518378 A | 5/2013 |
| JP | A-2015-038849 | 2/2015 |
| JP | A-2015-076133 | 4/2015 |
| JP | B-5835446 | 12/2015 |
| WO | WO 01/53198 | 7/2001 |
| WO | WO 2015/045009 A1 | 4/2015 |

OTHER PUBLICATIONS

Office Action for Japanese Patent Application No. 2015-194167 (dated Jan. 5, 2016).
Notice of Allowance for Japanese Patent Application No. 2015-194167 (dated Mar. 29, 2016).

* cited by examiner

*Primary Examiner* — Jonathan G Leong
*Assistant Examiner* — James Erwin
(74) *Attorney, Agent, or Firm* — Merchant & Gould P.C.

(57) ABSTRACT

[Problems]
To provide an electrode material for a lithium-ion rechargeable battery having a high mass energy density at a low temperature or in a high-speed charge and discharge.
[Means for Solving the Problems]
An electrode material for a lithium-ion rechargeable battery includes particles which are made of $LiFe_xMn_{1-w-x-y-z}Mg_yCa_zA_wPO_4$ (here, A represents at least one element selected from Co, Ni, Zn, Al, and Ga, $0 \leq w \leq 0.05$, $0.05 \leq x \leq 0.35$, $0.01 \leq y \leq 0.10$, and $0.0001 \leq z \leq 0.002$), have an orthorhombic crystal structure, and have a space group of Pmna, in which a change ratio $(V1-V2)/V1$ between a lattice volume V1 of $LiFe_xMn_{1-w-x-y-z}Mg_yCa_zA_wPO_4$ and a lattice volume V2 of $Fe_xMn_{1-w-x-y-z}Mg_yCa_zA_wPO_4$ obtained by chemically deintercalating Li from $LiFe_xMn_{1-w-x-y-z}Mg_yCa_zA_wPO_4$ is in a range of 0.06 to 0.09.

4 Claims, No Drawings

ELECTRODE MATERIAL FOR LITHIUM-ION RECHARGEABLE BATTERY

CROSS-REFERENCE TO RELATED APPLICATIONS

This application claims the benefit of Japanese Patent Application No. 2015-194167 filed Sep. 30, 2015, the disclosure of which is herein incorporated by reference in its entirety.

TECHNICAL FIELD

The present invention relates to an electrode material for a lithium-ion rechargeable battery.

BACKGROUND ART

A cathode material made of $LiMnPO_4$ is a material that can be expected to have a higher battery reaction voltage and an energy density approximately 20% higher than a cathode material made of $LiFePO_4$. Therefore, the cathode material made of $LiMnPO_4$ is expected to be developed as a secondary battery for an electrical vehicle.

However, a lithium-ion rechargeable battery including a cathode which includes a cathode material made of $LiMnPO_4$ has the following problems. (1) The low electron conductivity of bulk $LiMnPO_4$, (2) the low Li diffusivity of the bulk $LiMnPO_4$, and (3) the anisotropic and large volume change of a $LiMnPO_4$ crystal attributed to a battery reaction which is caused by the Jahn-Teller effect of a manganese ion ($Mn^{2+}$). Due to these problems, in a lithium-ion rechargeable battery, the activation energy for intercalating and deintercalating lithium ions into and from a cathode becomes high. As a result, in the lithium-ion rechargeable battery, battery characteristics at a low temperature significantly degrade.

In order to improve the battery characteristics of a lithium-ion rechargeable battery at a low temperature, active studies are underway regarding $LiFe_xMn_{1-x}PO_4$ (0<x<1) in which a portion of Mn in $LiMnPO_4$ is substituted with Fe (for example, refer to Patent Document 1). In $LiFe_xMn_{1-x}PO_4$, Fe forms a solid solution, and thus electron conductivity among particles improves more than $LiMnPO_4$. As a result, in a lithium-ion rechargeable battery including a cathode which includes a cathode material made of $LiFe_xMn_{1-x}PO_4$, charge and discharge performance improves.

PRIOR ART REFERENCES

Patent Documents

[Patent Document 1] Japanese Unexamined Patent Application, First Publication No. 2013-101883
[Patent Document 2] Published Japanese Translation No. 2013-518378 of the PCT International Publication
[Patent Document 3] Published Japanese Translation No. 2013-518023 of the PCT International Publication

SUMMARY OF THE INVENTION

Problems to be Solved

However, there are no reports of an example in which a cathode material capable of realizing a lithium-ion rechargeable battery having excellent battery characteristics at a low temperature is obtained using the method described in Patent Document 1 etc. In order to realize a lithium-ion rechargeable battery having excellent battery characteristics at a low temperature, it is considered that 50% or more of Mn in $LiMnPO_4$ needs to be substituted with Fe. In a lithium-ion rechargeable battery for which a cathode material made of $LiFe_xMn_{1-x}PO_4$ having a large substitution amount of Fe is used (hereinafter, referred to as "lithium-ion rechargeable battery A"), the charge and discharge capacity increases more than in a lithium-ion rechargeable battery for which a cathode material made of $LiMnPO_4$ is used (hereinafter, referred to as "lithium-ion rechargeable battery B"). However, in the lithium-ion rechargeable battery A, the proportion of a battery reaction at a high temperature, which is derived from $LiMnPO_4$, decreases, and a battery reaction derived from $LiFePO_4$ increases. Therefore, in the lithium-ion rechargeable battery A, an effect of improving the energy density, which is expected due to $LiMnPO_4$ included in the cathode, cannot be obtained. Meanwhile, the lithium-ion rechargeable battery B or a lithium-ion rechargeable battery for which a cathode material made of $LiFe_xMn_{1-x}PO_4$ having a small substitution amount of Fe is used has the following problems due to the low electron conductivity of the bulk $LiMnPO_4$, the low Li diffusivity of the bulk $LiMnPO_4$, and the Jahn-Teller effect of $Mn^{2+}$. That is, the lithium-ion rechargeable battery has a problem in that a favorable discharge capacity or a favorable mass energy density cannot be obtained, particularly, at a low temperature or in a high-speed charge and discharge.

Therefore, studies are made regarding $LiFe_xMn_{1-x-y}M_yPO_4$ in which Mn in $LiFe_xMn_{1-x}PO_4$ is further substituted with a divalent metal so that the electric characteristics of $LiFe_xMn_{1-x}PO_4$ further improve and the energy density increases in a case in which $LiFe_xMn_{1-x}PO_4$ is used as an electrode material (for example, refer to Patent Documents 2 and 3).

The present invention has been made in consideration of the above-described circumstances, and an object of the present invention is to provide an electrode material for a lithium-ion rechargeable battery having a high mass energy density at a low temperature or in a high-speed charge and discharge.

Means for Solving the Problems

The present inventors and the like carried out intensive studies in order to solve the above-described problems, and consequently found that, in particles made of $LiFe_xMn_{1-w-x-y-z}Mg_yCa_zA_wPO_4$, setting of a change ratio (V1−V2)/V1 between a lattice volume V1 of $LiFe_xMn_{1-w-x-y-z}Mg_yCa_zA_wPO_4$ and a lattice volume V2 of $Fe_xMn_{1-w-x-y-z}Mg_yCa_zA_wPO_4$ obtained by chemically deintercalating Li from $LiFe_xMn_{1-w-x-y-z}Mg_yCa_zA_wPO_4$ in a predetermined range brings about the following and completed the present invention. That is, it was found that low-temperature characteristics and high-speed charge and discharge characteristics can be significantly improved without impairing the high mass energy density of $LiFe_xMn_{1-w-x-y-z}Mg_yCa_zA_wPO_4$ more than necessary.

An electrode material for a lithium-ion rechargeable battery of the present invention includes particles which are made of $LiFe_xMn_{1-w-x-y-z}Mg_yCa_zA_wPO_4$ (here, A represents at least one element selected from Co, Ni, Zn, Al, and Ga, 0≤w≤0.05, 0.05≤x≤0.35, 0.01≤y≤0.10, and 0.0001≤z≤0.002), have an orthorhombic crystal structure, and have a space group of Pmna, in which a change ratio (V1−V2)/V1 between a lattice volume V1 of $LiFe_xMn_{1-w-x-y-z}Mg_yCa_zA_wPO_4$ and a lattice volume V2 of $Fe_xMn_{1-w-x-y-z}Mg_yCa_zA_wPO_4$ obtained by chemically deintercalating Li from $LiFe_xMn_{1-w-x-y-z}Mg_yCa_zA_wPO_4$ is in a range of 0.06 to 0.09.

Effect of the Invention

According to the electrode material for a lithium-ion rechargeable battery of the present invention, it is possible to realize a lithium-ion rechargeable battery having a high mass energy density at a low temperature or in a high-speed charge and discharge.

EMBODIMENTS FOR CARRYING OUT THE INVENTION

An embodiment of an electrode material for a lithium-ion rechargeable battery of the present invention will be described.

Meanwhile, the present embodiment is a specific description for easier understanding of the gist of the present invention and, unless particularly otherwise described, does not limit the present invention.

Electrode Material for Lithium-Ion Rechargeable Battery

An electrode material for a lithium-ion rechargeable battery of the present embodiment includes particles which are made of $LiFe_xMn_{1-w-x-y-z}Mg_yCa_zA_wPO_4$ (here, A represents at least one element selected from Co, Ni, Zn, Al, and Ga, $0 \leq w \leq 0.05$, $0.05 \leq x \leq 0.35$, $0.01 \leq y \leq 0.10$, and $0.0001 \leq z \leq 0.002$), have an orthorhombic crystal structure, and have a space group of Pmna. In addition, the change ratio (V1−V2)/V1 between the lattice volume V1 of $LiFe_xMn_{1-w-x-y-z}Mg_yCa_zA_wPO_4$ and the lattice volume V2 of $Fe_xMn_{1-w-x-y-z}Mg_yCa_zA_wPO_4$ obtained by chemically deintercalating Li from $LiFe_xMn_{1-w-x-y-z}Mg_yCa_zA_wPO_4$ is in a range of 0.06 to 0.09.

The electrode material for a lithium-ion rechargeable battery of the present embodiment is mainly used as a cathode material for a lithium-ion rechargeable battery.

In the electrode material for a lithium-ion rechargeable battery of the present embodiment, the surfaces of primary particles of an electrode active material made of $LiFe_xMn_{1-w-x-y-z}Mg_yCa_zA_wPO_4$ are coated with a carbonaceous film.

The average primary particle diameter of the primary particles of the electrode active material made of $LiFe_xMn_{1-w-x-y-z}Mg_yCa_zA_wPO_4$ is preferably in a range of 40 nm to 500 nm and more preferably in a range of 70 nm to 400 nm.

Here, the reason for setting the average primary particle diameter of the primary particles of the electrode active material made of $LiFe_xMn_{1-w-x-y-z}Mg_yCa_zA_wPO_4$ in the above-described range is as described below. When the average primary particle diameter of the primary particles of the electrode active material made of $LiFe_xMn_{1-w-x-y-z}Mg_y$-$Ca_zA_wPO_4$ is less than 40 nm, the primary particles are too small, and thus it becomes difficult to favorable hold crystallinity. As a result, it becomes impossible to obtain $LiFe_xMn_{1-w-x-y-z}Mg_yCa_zA_wPO_4$ particles in which the length of a crystal lattice of the $LiFe_xMn_{1-x}Mg_yA_zPO_4$ particle in a b axis direction is distinctively shortened while maintaining the lengths in an a axis direction and in a c axis direction to be large. On the other hand, when the average primary particle diameter of the $LiFe_xMn_{1-w-x-y-z}Mg_yCa_zA_wPO_4$ particles exceeds 500 nm, the $LiFe_xMn_{1-w-x-y-z}Mg_yCa_zA_wPO_4$ particles are not sufficiently miniaturized, and consequently, extremely fine particles having favorable crystallinity cannot be obtained.

The thickness of the carbonaceous film is preferably in a range of 1 nm to 5 nm.

The reason for setting the thickness of the carbonaceous film in the above-described range is as described below. When the thickness is less than 1 nm, the thickness of the carbonaceous film is too thin, and thus it becomes impossible to form a film having a desired resistance value. As a result, conductivity decreases, and it becomes impossible to ensure conductivity suitable for an electrode material. On the other hand, when the thickness of the carbonaceous film exceeds 5 nm, battery activity, for example, the battery capacity per unit mass of the electrode material, decreases.

The average primary particle diameter of the primary particles of the electrode active material made of $LiFe_xMn_{1-w-x-y-z}Mg_yCa_zA_wPO_4$ coated with the carbonaceous film is preferably in a range of 60 nm to 550 nm and more preferably in a range of 70 nm to 430 nm.

Here, the reason for setting the average primary particle diameter of the primary particles of the electrode active material made of $LiFe_xMn_{1-w-x-y-z}Mg_yCa_zA_wPO_4$ coated with the carbonaceous film in the above-described range is as described below. When the average primary particle diameter is less than 60 nm, the specific surface area of carbonaceous electrode active material composite particles increases, and thus the mass of required carbon is increased, and the charge and discharge capacity is decreased. Furthermore, carbon coating becomes difficult, it is not possible to obtain primary particles having a sufficient coating ratio, and a favorable mass energy density cannot be obtained, particularly, at a low temperature or in a high-speed charge and discharge. On the other hand, when the average primary particle diameter exceeds 550 nm, time is taken for lithium ions or electrons to migrate among the carbonaceous electrode active material composite particles, and thus the internal resistance increases, and the output characteristics deteriorate, which is not preferable.

The shape of the primary particle of the electrode active material made of $LiFe_xMn_{1-w-x-y-z}Mg_yCa_zA_wPO_4$ coated with the carbonaceous film is not particularly limited, but is preferably a spherical shape since it is easy to generate an electrode material made of spherical particles, particularly, truly spherical particles.

Here, the reason for the shape of the primary particle of the electrode active material being preferably a spherical shape is as described below. It is possible to decrease the amount of a solvent when an electrode material paste for a lithium-ion rechargeable battery is prepared by mixing the primary particles of the electrode active material coated with the carbonaceous film, a binding agent, and a solvent. Furthermore, it also becomes easy to apply the electrode material paste for a lithium-ion rechargeable battery to a current collector. In addition, when the shape of the primary particle of the electrode active material is a spherical shape, the surface area of the primary particles of the electrode active material is minimized, furthermore, it is possible to minimize the mixing amount of the binding agent added to the electrode material paste for a lithium-ion rechargeable battery, and the internal resistance of the obtained electrode can be decreased.

Furthermore, when the shape of the primary particle of the electrode active material is a spherical shape, particularly, a truly spherical shape, it becomes easy to closely pack the primary particles. Therefore, the amount of the electrode material for a lithium-ion rechargeable battery packed per unit volume increases, and consequently, it is possible to increase the electrode density, and the capacity of the lithium-ion battery can be increased, which is preferable.

The amount of carbon included in the electrode material for a lithium-ion rechargeable battery of the present embodiment is preferably in a range of 0.5% by mass to 3.5% by mass and more preferably in a range of 0.7% by mass to 2.5% by mass.

Here, the reason for limiting the amount of carbon included in the electrode material for a lithium-ion rechargeable battery of the present embodiment in the above-described range is as described below. When the amount of carbon is less than 0.5% by mass, the discharge capacity at a high charge-discharge rate is decreased in a case in which a battery is formed, and it becomes difficult to realize sufficient charge and discharge rate performance. On the other hand, when the amount of carbon included in the electrode material for a lithium-ion rechargeable battery exceeds 3.5% by mass, the amount of carbon is too large, and the battery capacity of a lithium-ion battery per unit mass of the primary particles of the electrode active material is decreased more than necessary.

In addition, the ratio of the carbon supporting amount to the specific surface area of the primary particles of the electrode active material ([the carbon supporting amount]/[the specific surface area of the primary particles of the electrode active material]) is preferably in a range of 0.75 to 1.15 and more preferably in a range of 0.8 to 1.1.

Here, the reason for limiting the carbon supporting amount in the electrode material for a lithium-ion rechargeable battery of the present embodiment in the above-described range is as described below. When the carbon supporting amount is less than 0.75, the discharge capacity at a high charge-discharge rate is decreased in a case in which a battery is formed, and it becomes difficult to realize sufficient charge and discharge rate performance. On the other hand, when the carbon supporting amount exceeds 1.15, the amount of carbon is too large, and the battery capacity of a lithium-ion battery per unit mass of the primary particles of the electrode active material is decreased more than necessary.

The specific surface area of the electrode material for a lithium-ion rechargeable battery of the present embodiment is preferably in a range of 7 $m^2/g$ to 18 $m^2/g$ and more preferably in a range of 9 $m^2/g$ to 15 $m^2/g$.

Here, the reason for limiting the specific surface area of the electrode material for a lithium-ion rechargeable battery of the present embodiment in the above-described range is as described below. When the specific surface area is less than 7 $m^2/g$, it takes time for lithium ions or electrons to migrate among the carbonaceous electrode active material composite particles, and thus the internal resistance increases, and the output characteristics deteriorate, which is not preferable. On the other hand, the specific surface area exceeds 18 $m^2/g$, the specific surface area of the carbonaceous electrode active material composite particles is increased, and thus the mass of required carbon is increased, and the charge and discharge capacity is decreased, which is not preferable.

Electrode Active Material

The electrode active material is made of $LiFe_xMn_{1-w-x-y-z}Mg_yCa_zA_wPO_4$ having a crystal structure preferable for Li diffusion (here, A represents at least one element selected from Co, Ni, Zn, Al, and Ga, $0 \leq w \leq 0.05$, $0.05 \leq x \leq 0.35$, $0.01 \leq y \leq 0.10$, and $0.0001 \leq z \leq 0.002$).

In $LiFe_xMn_{1-w-x-y-z}Mg_yCa_zA_wPO_4$, the reason for x satisfying $0.05 \leq x \leq 0.35$ is as described below. Since Fe develops a charge and discharge capacity at a voltage of near 3.5 V, a decrease in the energy density caused by formation of a solid solution is milder than that of Co or Zn, and thus a relatively large amount of Fe has been set to be available for formation of a solid solution so that an improvement of low-temperature characteristics is expected while the energy density is not excessively decreased. Furthermore, Fe is a carbonization catalyst element and, when forming a Fe solid solution, improves the coating properties of the carbonaceous film and thus enables an improvement of output characteristics or low-temperature characteristics. Therefore, the amount of a solid solution at which a sufficient carbonization catalyst action can be developed has been set as a solid solution range. Particularly, $0.05 \leq x \leq 0.25$ is preferred.

The reason for setting y to satisfy $0.01 \leq y \leq 0.10$ is as described below. Mg is an electrochemical inert element in a voltage range of 1.0 V to 4.3 V, has a strong effect of improving electron conductivity, Li diffusivity, and the activation energy for an intercalation and deintercalation reaction of a lithium ion ($Li^+$), and has a strong effect of improving the energy density. However, when a large amount of Mg forms a solid solution, the charge and discharge capacity and the energy density are significantly decreased, and thus a relatively small amount of Mg at which low-temperature characteristics can be sufficiently improved while the energy density is not excessively decreased has been set to be available for formation of a solid solution. Particularly, $0.01 \leq y \leq 0.05$ is preferred.

The reason for setting z to satisfy $0.0001 \leq z \leq 0.002$ is as described below.

Ca is an electrochemical inert element in a voltage range of 1.0 V to 4.3 V and is a useful element capable of producing an effect of improving low-temperature characteristics when added in a small amount. However, when a large amount of Ca forms a solid solution, the charge and discharge capacity and the energy density are significantly decreased, and, in a case in which a large amount of Ca is added, Ca is present in a crystal not as a solid solution but as an impurity, and, when dissolved as an impurity during the operation of a battery, the service life characteristics deteriorate. Therefore, a relatively small amount of Ca at which low-temperature characteristics can be sufficiently improved while the energy density is not excessively decreased has been set to be available for formation of a solid solution. Particularly, $0.0001 \leq z \leq 0.001$ is preferred.

The reason for setting w to satisfy $0 \leq w \leq 0.05$ is as described below. Co or Zn is an electrochemical inert element in a voltage range of 1.0 V to 4.3 V, has a strong effect of improving electron conductivity, Li diffusivity, and the activation energy for an intercalation and deintercalation reaction of a lithium ion ($Li^+$), and has a strong effect of improving the energy density, and thus Co or Zn can be appropriately added. However, when a large amount of Co or Zn forms a solid solution, the charge and discharge capacity and the energy density are significantly decreased, and thus a relatively small amount of Mg at which low-temperature characteristics can be sufficiently improved while the energy density is not excessively decreased has been set to be available for formation of a solid solution. Particularly, $0 \leq w \leq 0.01$ is preferred.

$LiFe_xMn_{1-w-x-y-z}Mg_yCa_zA_wPO_4$ has an orthorhombic crystal structure and has a space group of Pnma.

In a lithium-ion rechargeable battery for which $LiFe_xMn_{1-w-x-y-z}Mg_yCa_zA_wPO_4$ is used as a cathode material, Li is deintercalated from the $LiFe_xMn_{1-w-x-y-z}Mg_yCa_zA_wPO_4$ cathode material during charging. Since the volume change ratio caused by Li intercalated and deintercalated during charging and discharging has a large influence on battery characteristics at a low temperature or in a high-speed charge and discharge, it is necessary to adjust the volume change ratio.

The change ratio (V1−V2)/V1 between the lattice volume V1 of $LiFe_xMn_{1-w-x-y-z}Mg_yCa_zA_wPO_4$ and the lattice volume V2 of $Fe_xMn_{1-w-x-y-z}Mg_yCa_zA_wPO_4$ obtained by chemically deintercalating Li from $LiFe_xMn_{1-w-x-y-z}Mg_yCa_zA_wPO_4$ is in a range of 0.06 to 0.09 and more preferably in a range of 0.07 to 0.09.

Here, the reason for setting the change ratio (V1−V2)/V1 between the lattice volume V1 and the lattice volume V2 in the above-described range is as described below. When (V1−V2)/V1 is less than 0.06, Li is not sufficiently deintercalated and remains in a material, and thus, in a case in which this material is provided to a battery, a sufficient capacity cannot be obtained, and the energy density is decreased, which is not preferable. On the other hand, when (V1−V2)/V1 exceeds 0.09, the volume significantly changes due to charging and discharging, it is necessary to increase the activation energy relating to intercalation and deintercalation of Li, and the energy density is decreased, which is not preferable.

In the electrode material for a lithium-ion rechargeable battery of the present embodiment, the ratio L/R of a value L of the charge capacity of $LiFe_xMn_{1-w-x-y-z}Mg_yCa_zA_wPO_4$ at an electric current density of 0.1 CA, which is measured at 0° C., to a value R of the charge capacity of $LiFe_xMn_{1-w-x-y-z}Mg_yCa_zA_wPO_4$ at an electric current density of 0.1 CA, which is measured at 25° C., is preferably in a range of 0.825 to 0.996 and more preferably in a range of 0.835 to 0.996.

Here, the reason for setting the ratio L/R of the value L of the charge capacity to the value R of the charge capacity in the above-described range is as described below. When L/R is less than 0.825, the charge and discharge capacity at a low temperature significantly decreases, and thus a sufficient energy density cannot be obtained in a case in which a battery is operated at a low temperature, which is not preferable. On the other hand, when L/R exceeds 0.996, it is considered that an abnormal electric current flows due to a side reaction caused by operation of a battery at a low temperature, and deterioration of the service life characteristics is caused, which is not preferable.

The charge capacity (mAh/g) of $LiFe_xMn_{1-w-x-y-z}Mg_yCa_zA_wPO_4$ at an electric density of 0.1 CA is measured by carrying out constant electric current charging at an electric current value of 0.1 CA at an environmental temperature of 0° C. until the voltage of the cathode reaches 4.3 V with respect to the equilibrium voltage of Li and, after the voltage reaches 4.3 V, carrying out constant voltage charging until the electric current value reaches 0.01 CA.

In the electrode material for a lithium-ion rechargeable battery of the present embodiment, the discharge capacity of $LiFe_xMn_{1-w-x-y-z}Mg_yCa_zA_wPO_4$ at an electric current density of 0.1 CA measured at 0° C. is preferably 120 mAh/g or more and more preferably 125 mAh/g or more.

Here, the reason for setting the discharge capacity in the above-described range is as described below. When the discharge capacity is less than 120 mAh/g, the low-temperature capacity becomes insufficient and becomes inappropriate for use of a battery at a low temperature.

Method for Manufacturing Electrode Material for Lithium-Ion Rechargeable Battery A method for manufacturing an electrode material for a lithium-ion rechargeable battery of the present embodiment is not particularly limited, and examples thereof include a method including a step of synthesizing $LiFe_xMn_{1-w-x-y-z}Mg_yCa_zA_wPO_4$ particles under pressure by heating a raw material slurry α obtained by mixing a Li source, a Fe source, a Mn source, a Mg source, a P source, and an A source with a solvent including water as a main component at a temperature in a range of 150° C. to 250° C. and a step of coating the surfaces of the $LiFe_xMn_{1-w-x-y-z}Mg_yCa_zA_wPO_4$ particles (primary particles) with a carbonaceous film by drying a raw material slurry β obtained by dispersing the $LiFe_xMn_{1-w-x-y-z}Mg_yCa_zA_wPO_4$ particles in a water solvent including a carbon source so as to granulate the slurry and then heating the slurry at a temperature in a range of 500° C. to 860° C.

A method for synthesizing the $LiFe_xMn_{1-w-x-y-z}Mg_yCa_zA_wPO_4$ particles is not particularly limited and, for example, a Li source, a Fe source, a Mn source, a Mg source, a P source, and an A (at least one element selected from Co, Ni, Zn, Al, and Ga) source are injected into a solvent including water as a main component and stirred, thereby preparing the raw material slurry α including a raw material of $LiFe_xMn_{1-w-x-y-z}Mg_yCa_zA_wPO_4$ particles.

The Li source, the Fe source, the Mn source, the Mg source, a Ca source, the A source, and the P source are injected into the solvent including water as a main component so that the molar ratio therebetween (Li source:Fe source:Mn source:Mg source:Ca source:A source:P source), that is, the molar ratio of Li:Fe:Mn:Mg:Ca:A:P reaches 2 to 3.5:0.05 to 0.35:0.94 to 0.55:0.01 to 0.10:0.0001 to 0.005:0 to 0.05:0.95 to 1.10, the sources are stirred and mixed together, thereby preparing the raw material slurry α.

In order to uniformly mix the Li source, the Fe source, the Mn source, the Mg source, the Ca source, the A source, and the P source together, it is preferable to respectively put the Li source, the Fe source, the Mn source, the Mg source, the Ca source, the A source, and the P source into an aqueous solution state temporarily and then mix the sources together.

The molar concentration of the Li source, the Fe source, the Mn source, the Mg source, the Ca source, the A source, and the P source in the raw material slurry α is preferably in a range of 0.8 mol/L to 3.5 mol/L since it is necessary to obtain highly pure, highly crystalline, and extremely fine $LiFe_xMn_{1-w-x-y-z}Mg_yCa_zA_wPO_4$ particles.

Examples of the Li source include hydroxides such as lithium hydroxide (LiOH), inorganic lithium acid salts such as lithium carbonate ($Li_2CO_3$), lithium chloride (LiCl), lithium nitrate ($LiNO_3$), lithium phosphate ($Li_3PO_4$), lithium hydrogen phosphate ($Li_2HPO_4$), and lithium dihydrogen phosphate ($LiH_2PO_4$), organic lithium acid salts such as lithium acetate ($LICH_3COO$) and lithium oxalate (($COOLi)_2$), and hydrates thereof. As the Li source, at least one compound selected from the above-described group is preferably used.

Meanwhile, lithium phosphate ($Li_3PO_4$) can also be used as the Li source and the P source.

As the Fe source, iron compounds such as iron (II) chloride ($FeCl_2$), iron (II) sulfate ($FeSO_4$), and iron (II) acetate ($Fe(CH_3COO)_2$) or hydrates thereof, trivalent iron compounds such as iron (III) nitrate ($Fe(NO_3)_3$), iron (III) chloride ($FeCl_3$), and iron (III) citrate ($FeC_6H_5O_7$), lithium iron phosphate, or the like can be used.

The Mn source is preferably an Mn salt, and examples thereof include manganese (II) chloride ($MnCl_2$), manganese (II) sulfate ($MnSO_4$), manganese (II) nitrate ($Mn(NO_3)_2$), manganese (II) acetate ($Mn(CH_3COO)_2$), and hydrates thereof. As the Mn source, at least one compound selected from the above-described group is preferably used.

An Mg source is preferably an Mg salt, and examples thereof include magnesium (II) chloride ($MgCl_2$), magnesium (II) sulfate ($MgSO_4$), magnesium (II) nitrate ($Mg(NO_3)_2$), magnesium (II) acetate ($Mg(CH_3COO)_2$), and hydrates thereof. As the Mg source, at least one compound selected from the above-described group is preferably used.

The Ca source is preferably a Ca salt, and examples thereof include calcium (II) hydroxide ($Ca(OH)_2$), calcium (II) chloride ($CaCl_2$), calcium (II) sulfate ($CaSO_4$), calcium (II) nitrate ($Ca(NO_3)_2$), calcium (II) acetate ($Ca(CH_3COO)_2$), and hydrates thereof. As the Ca source, at least one compound selected from the above-described group is preferably used.

As the P source, for example, at least one compound selected from phosphoric acids such as orthophosphonic acid ($H_3PO_4$) and metaphosphoric acid ($HPO_3$), phosphoric salts such as ammonium dihydrogen phosphate ($NH_4H_2PO_4$), diammonium phosphate (($NH_4)_2HPO_4$), ammonium phosphate (($NH_4)_3PO_4$), lithium phosphate ($Li_3PO_4$), lithium hydrogen phosphate ($LI_2HPO_4$), and lithium dihydrogen phosphate ($LiH_2PO_4$), and hydrates thereof is preferably used.

A Co source is preferably a Co salt, and examples thereof include cobalt (II) chloride ($CoCl_2$), cobalt (II) sulfate ($CoSO_4$), cobalt (II) nitrate ($Co(NO_3)_2$), cobalt (II) acetate ($Co(CH_3COO)_2$), and hydrates thereof. As the Co source, at least one compound selected from the above-described group is preferably used.

A Ni source is preferably, for example, a Ni salt, and examples thereof include nickel (II) chloride ($NiCl_2$), nickel (II) sulfate ($NiSO_4$), nickel (II) nitrate ($Ni(NO_3)_2$), nickel (II) acetate ($Ni(CH_3COO)_2$), and hydrates thereof. As the Ni source, at least one compound selected from a group made up of the above-described compounds is preferably used.

A Zn source is preferably a Zn salt, and examples thereof include zinc (II) chloride ($ZnCl_2$), zinc (II) sulfate ($ZnSO_4$), zinc (II) nitrate ($Zn(NO_3)_2$), zinc (II) acetate ($Zn(CH_3COO)_2$), and hydrates thereof. As the Zn source, at least one compound selected from a group made up of the above-described compounds is preferably used.

Examples of an Al source include aluminum compounds such as chlorides, sulfoxides, nitroxides, acetoxides, and hydroxides, and at least one compound selected from a group made up of the above-described compounds is preferably used.

Examples of a Ga source include gallium compounds such as chlorides, sulfoxides, nitroxides, acetoxides, and hydroxides, and at least one compound selected from a group made up of the above-described compounds is preferably used.

The solvent including water as a main component is anyone of water and water-based solvents which include water as a main component and include an aqueous solvent such as an alcohol as necessary.

The aqueous solvent is not particularly limited as long as the solvent is capable of dissolving the Li source, the Fe source, the Mn source, the Mg source, the P source, and the A source. Examples thereof include alcohols such as methanol, ethanol, 1-propanol, 2-propanol (isopropyl alcohol: IPA), butanol, pentanol, hexanol, octanol, and diacetone alcohol, esters such as ethyl acetate, butyl acetate, ethyl lactate, propylene glycol monomethyl ether acetate, propylene glycol monoethyl ether acetate, and γ-butyrolactone, ethers such as diethyl ether, ethylene glycol monomethyl ether (methyl cellosolve), ethylene glycol monoethyl ether (ethyl cellosolve), ethylene glycol monobutyl ether (butyl cellosolve), diethylene glycol monomethyl ether, and diethylene glycol monoethyl ether, ketones such as acetone, methyl ethyl ketone (MEK), methyl isobutyl ketone (MIBK), acetyl acetone, and cyclohexanone, amides such as dimethyl formamide, N,N-dimethylacetoacetamide, and N-methylpyrrolidone, glycols such as ethylene glycol, diethylene glycol, and propylene glycol, and the like. These aqueous solvents may be singly used or in a mixture form of two or more aqueous solvents.

Next, the raw material slurry α is put into a pressure-resistant container, is heated at a temperature in a range of 150° C. to 250° C., preferably, in a range of 165° C. to 215° C., and is hydrothermally treated for 0.5 hours to 60 hours, thereby obtaining $LiFe_xMn_{1-w-x-y-z}Mg_yCa_zA_wPO_4$ particles.

When raw material slurry reaches the temperature in a range of 150° C. to 250° C., the pressure in the pressure-resistant container reaches, for example, 0.1 MPa to 2 MPa.

In this case, it is possible to control the particle diameters of the $LiFe_xMn_{1-w-x-y-z}Mg_yCa_zA_wPO_4$ particles to be a desired size by adjusting the temperature and the duration during the hydrothermal treatment.

Next, the $LiFe_xMn_{1-w-x-y-z}Mg_yCa_zA_wPO_4$ particles are dispersed in the water solvent including a carbon source, thereby preparing a raw material slurry β.

Next, the raw material slurry β is dried and granulated, then, is heated at a temperature in a range of 500° C. to 860° C. for 0.5 hours to 60 hours, and the surfaces of the $LiFe_xMn_{1-w-x-y-z}Mg_yCa_zA_wPO_4$ particles (primary particles) with a carbonaceous film, thereby obtaining a cathode material for a lithium-ion rechargeable battery of the present embodiment.

The carbon source is not particularly limited, and for example, a natural water-soluble polymer such as gelatin, casein, collagen, hyaluronic acid, albumin, or starch, a semisynthetic polymer such as methyl cellulose, ethyl cellulose, methyl hydroxypropyl cellulose, carboxymethyl cellulose, hydroxymethyl cellulose, hydroxypropyl cellulose, carboxymethyl cellulose sodium, or propylene glycol alginade, a synthetic polymer such as polyvinyl alcohol, polyvinylpyrrolidone, a carbomer (carboxyvinyl polymer), polyacrylate, or polyethylene oxide, or the like can be used.

These carbon sources may be used singly or in a mixture form of two or more carbon sources.

In the method for manufacturing an electrode material for a lithium-ion rechargeable battery of the present embodiment, when the total mass of the electrode active material and the carbon source is set to 100% by mass, the additive amount (additive ratio) of the carbon source is preferably in a range of 1% by mass to 15% by mass and more preferably in a range of 2% by mass to 12% by mass.

When the additive amount of the carbon source is less than 1% by mass, mixing stability in the electrode material for a lithium-ion rechargeable battery degrades, which is not preferable. On the other hand, when the additive amount of the carbon source exceeds 15% by mass, the content of a cathode active material becomes relatively small, and battery characteristics degrade, which is not preferable.

Chemical Li Deintercalation

The electrode material for a lithium-ion rechargeable battery obtained as described above is mixed with a solution added to acetonitrile as an oxidant and is stirred for 1 hour to 48 hours, thereby chemically deintercalating Li.

As the oxidant, for example, nitrosonium tetrafluoroborate ($NOBF_4$) is preferably used.

The additive amount of the oxidant is set to an amount that is approximately 1.1 times the amount of Li deintercalated.

After the Li deintercation treatment, solid and liquid are separated from each other by means of filtration, the electrode material is washed with acetone and then is dried in a vacuum dryer at a temperature in a range of 25° C. to 70° C. for one hour to 48 hours.

By means of the above-described treatment, Li is chemically deintercalated from $LiFe_xMn_{1-w-x-y-z}Mg_yCa_zA_wPO_4$, and $Fe_xMn_{1-w-x-y-z}Mg_yCa_zA_wPO_4$ can be obtained.

Electrode for Lithium-Ion Rechargeable Battery

An electrode for a lithium-ion rechargeable battery of the present embodiment includes an electrode current collector and an electrode mixture layer (electrode) formed on the electrode current collector, and the electrode mixture layer includes the electrode material for a lithium-ion rechargeable battery of the present embodiment.

That is, the electrode for a lithium-ion rechargeable battery of the present embodiment is obtained by forming the electrode mixture layer formed on one main surface of the electrode current collector using the electrode material for a lithium-ion rechargeable battery of the present embodiment.

That is, the electrode for a lithium-ion rechargeable battery of the present embodiment is mainly used as a cathode for a lithium-ion rechargeable battery.

A method for manufacturing an electrode for a lithium-ion rechargeable battery of the present embodiment is not particularly limited as long as an electrode can be formed on one main surface of an electrode current collector using the electrode material for a lithium-ion rechargeable battery of the present embodiment. Examples of the method for manufacturing an electrode for a lithium-ion rechargeable battery of the present embodiment include the following method.

First, an electrode material paste for a lithium-ion rechargeable battery is prepared by mixing the electrode material for lithium-ion rechargeable battery of the present embodiment, a binding agent, a conductive auxiliary agent, and a solvent.

Binding Agent

The binding agent is not particularly limited as long as the binding agent can be used in a water system. As the binding agent, for example, at least one selected from a group of polyethylene, polypropylene, polyethylene terephthalate, polymethyl methacrylate, vinyl acetate copolymers, styrene/butadiene-based latexes, acrylic latexes, acrylonitrile/butadiene-based latexes, fluorine-based latexes, silicon-based latexes is used.

When the total mass of the electrode material for a lithium-ion rechargeable battery of the present embodiment, the binding agent, and the conductive auxiliary agent is set to 100% by mass, the content ratio of the binding agent to the electrode material paste for a lithium-ion rechargeable battery is preferably in a range of 1 part by mass to 10 parts by mass and more preferably in a range of 2 parts by mass to 6 parts by mass.

Conductive Auxiliary Agent

The conductive auxiliary agent is not particularly limited, and, for example, at least one conductive auxiliary agent selected from a group of fibrous carbon such as acetylene black, Ketjen black, furnace black, vapor grown carbon fiber (VGCF), and carbon nanotube is used.

When the total mass of the electrode material for a lithium-ion rechargeable battery of the present embodiment, the binding agent, and the conductive auxiliary agent is set to 100% by mass, the content ratio of the conductive auxiliary agent to the electrode material paste for a lithium-ion rechargeable battery is preferably in a range of 1 part by mass to 15 parts by mass and more preferably in a range of 3 parts by mass to 10 parts by mass.

Solvent

To the electrode material paste for a lithium-ion rechargeable battery including the cathoode material for a lithium-ion rechargeable battery of the present embodiment, a solvent may be appropriately added in order to facilitate coating of an article to be coated such as a current collector.

A main solvent is water, but the electrode material paste may include a water-based solvent such as an alcohol, a glycol, or an ether as long as the characteristics of the cathode material for a lithium-ion rechargeable battery of the present embodiment.

When the total mass of the electrode material for a lithium-ion rechargeable battery of the present embodiment, the binding agent, the conductive auxiliary agent, and the solvent is set to 100% by mass, the content ratio of the solvent to the electrode material paste for a lithium-ion rechargeable battery is preferably in a range of 80 parts by mass to 300 parts by mass and more preferably in a range of 100 parts by mass to 250 parts by mass.

When the solvent is included in the above-described range, it is possible to obtain an electrode material paste for a lithium-ion rechargeable battery having excellent electrode formability and excellent battery characteristics.

A method for mixing the cathode material for a lithium-ion rechargeable battery of the present embodiment, the binding agent, the conductive auxiliary agent, and the solvent is not particularly limited as long as it is possible to uniformly mix the above-described components. Examples thereof include methods in which a kneader such as a ball mill, a sand mill, a planetary mixer, a paint shaker, or a homogenizer is used.

Next, the electrode material paste for a lithium-ion rechargeable battery is applied to one main surface of the electrode current collector so as to form a coating, and the coating is dried and then pressed under pressure, whereby it is possible to obtain an electrode for a lithium-ion rechargeable battery including the electrode mixture layer formed on one main surface of the electrode current collector.

Lithium-Ion Rechargeable Battery

A lithium-ion rechargeable battery of the present embodiment includes the electrode for a lithium-ion rechargeable battery of the present embodiment (cathode), an anode, a separator, and an electrolytic solution.

In the lithium-ion rechargeable battery of the present embodiment, the anode, the electrolyte, the separator, and the like are not particularly limited.

As the anode, for example, an anode material such as metallic Li, a carbon material, a Li alloy, or $Li_4Ti_5O_{12}$ is used.

In addition, a solid electrolyte may be used instead of the electrolyte and the separator.

The electrolyte can be produced by mixing ethylene carbonate (EC) and ethyl methyl carbonate (EMC) so that the volume ratio therebetween reaches 1:1 and dissolving lithium hexafluorophosphate ($LiPF_6$) in the obtained solvent mixture so that the concentration thereof reaches, for example, 1 mol/dm$^3$.

As the separator, it is possible to use, for example, porous propylene.

In the lithium-ion rechargeable battery of the present embodiment, since the electrode for a lithium-ion rechargeable battery of the present embodiment is used as the cathode, and thus the lithium-ion rechargeable battery has a high capacity and a high energy density.

As described above, according to the electrode material for a lithium-ion rechargeable battery of the present embodiment, since electron conductivity and ion conductivity improves, it is possible to realize a lithium-ion rechargeable battery having a high mass energy density at a low temperature or in a high-speed charge and discharge.

EXAMPLES

Hereinafter, the present invention will be more specifically described using examples and comparative examples, but the present invention is not limited to the following examples.

Example 1

Synthesis of Electrode Material for Lithium-Ion Rechargeable Battery $LiFe_{0.1898}Mn_{0.80}Mg_{0.01}Ca_{0.0002}PO_4$ was synthesized in the following manner.

$Li_3PO_4$ as a Li source and a P source, an aqueous solution of $FeSO_4$ as a Fe source, an aqueous solution of $MnSO_4$ as a Mn source, an aqueous solution of $MgSO_4$ as a Mg source, and an aqueous solution of $Ca(OH)_2$ as a Ca source were mixed together so that the molar ratio therebetween reached Li:Fe:Mn:Mg:Ca:P=3:0.2:0.79:0.01:0.0003:1, thereby preparing 250 ml of a raw material slurry α.

Next, this raw material slurry α was put into a pressure resistant vessel.

After that, hydrothermal synthesis was carried out by performing a heating reaction on the raw material slurry α at 1750° C. for 24 hours.

After the reaction, the atmosphere in the pressure resistant vessel was cooled to room temperature, thereby obtaining a cake-state precipitate of a reaction product.

This precipitate was sufficiently washed with distilled water a plurality of times, and the water content ratio thereof was maintained at 40% so as to prevent the precipitate from being dried, thereby producing a cake-form substance.

This cake-form substance was dried in a vacuum at 70° C. for two hours, raw material slurry β obtained by dispersing 2% by mass of polyvinyl alcohol adjusted in advance to be 10% by mass relative to 95% by mass of the obtained powder (particles) in a water solvent was dried and granulated, and then a thermal treatment was carried out at 720° C. for two hours. Therefore, the surfaces of the particles were coated with a carbonaceous film, and an electrode material for a lithium-ion rechargeable battery of Example 1 was obtained.

Example 2

Synthesis of Electrode Material for Lithium-Ion Rechargeable Battery $LiFe_{0.1848}Mn_{0.80}Mg_{0.01}Ca_{0.0002}Co_{0.005}PO_4$ was synthesized in the following manner.

$Li_3PO_4$ as a Li source and a P source, an aqueous solution of $FeSO_4$ as a Fe source, an aqueous solution of $MnSO_4$ as a Mn source, an aqueous solution of $MgSO_4$ as a Mg source, and an aqueous solution of $Ca(OH)_2$ as a Ca source, and an aqueous solution of $CoSO4$ as a Co source were mixed together so that the molar ratio therebetween reached Li:Fe:Mn:Mg:Ca:Co:P=3:0.2:0.75:0.05:0.0003:0.005:1, thereby preparing 250 ml of a raw material slurry α.

Hereinafter, an electrode material for a lithium-ion rechargeable battery of Example 2 was obtained in the same manner as in Example 1.

Comparative Example 1

Synthesis of Electrode Material for Lithium-Ion Rechargeable Battery $LiFe_{0.20}Mn_{0.80}PO_4$ was synthesized in the following manner.

$Li_3PO_4$ as a Li source and a P source, an aqueous solution of $FeSO_4$ as a Fe source, an aqueous solution of $MnSO_4$ as a Mn source, and an aqueous solution of $Ca(OH)_2$ as a Ca source were mixed together so that the molar ratio therebetween reached Li:Fe:Mn:Ca:P=3:0.2:0.80:0.03:1, thereby preparing 250 ml of a raw material slurry α.

Hereinafter, an electrode material for a lithium-ion rechargeable battery of Comparative Example 1 was obtained in the same manner as in Example 1.

Comparative Example 2

Synthesis of Electrode Material for Lithium-Ion Rechargeable Battery $LiFe_{0.19}Mn_{0.80}Mg_{0.01}PO_4$ was synthesized in the following manner.

$Li_3PO_4$ as a Li source and a P source, an aqueous solution of $FeSO_4$ as a Fe source, an aqueous solution of $MnSO_4$ as a Mn source, and an aqueous solution of $MgSO_4$ as a Mg source were mixed together so that the molar ratio therebetween reached Li:Fe:Mn:Mg:P=3:0.2:0.79:0.05:1, thereby preparing 250 ml of a raw material slurry α.

Hereinafter, an electrode material for a lithium-ion rechargeable battery of Comparative Example 2 was obtained in the same manner as in Example 1.

Comparative Example 3

Synthesis of Electrode Material for Lithium-Ion Rechargeable Battery $LiFe_{0.0798}Mn_{0.80}Mg_{0.12}Ca_{0.0002}PO_4$ was synthesized in the following manner.

$Li_3PO_4$ as a Li source and a P source, an aqueous solution of $FeSO_4$ as a Fe source, an aqueous solution of $MnSO_4$ as a Mn source, an aqueous solution of $MgSO_4$ as a Mg source, and an aqueous solution of $Ca(OH)_2$ as a Ca source were mixed together so that the molar ratio therebetween reached Li:Fe:Mn:Mg:Ca:P=3:0.0798:0.80:0.12:0.0005:1, thereby preparing 250 ml of a raw material slurry α.

Hereinafter, an electrode material for a lithium-ion rechargeable battery of Comparative Example 3 was obtained in the same manner as in Example 1.

Comparative Example 4

Synthesis of Electrode Material for Lithium-Ion Rechargeable Battery $LiFe_{0.1998}Mn_{0.80}Ca_{0.0002}PO_4$ was synthesized in the following manner.

$Li_3PO_4$ as a Li source and a P source, an aqueous solution of $FeSO_4$ as a Fe source, an aqueous solution of $MnSO_4$ as a Mn source, and an aqueous solution of $Ca(OH)_2$ as a Ca source were mixed together so that the molar ratio therebetween reached Li:Fe:Mn:Ca:P=3:0.1998:0.80:0.0005:1, there by preparing 250 ml of a raw material slurry α.

Hereinafter, an electrode material for a lithium-ion rechargeable battery of Comparative Example 4 was obtained in the same manner as in Example 1.

Evaluation of Electrode Material for Lithium-Ion Rechargeable Battery (1) Amount of Carbon The amount of carbon in the electrode material for a lithium-ion rechargeable battery of each of the examples and the comparative examples was measured using a carbon analyzer (trade name: EMIA-220V, manufactured by Horiba Ltd.). The results are shown in Table 1.

(2) Specific Surface Area

The specific surface area of the electrode material for a lithium-ion rechargeable battery of each of the examples and the comparative examples was measured using a specific surface area meter (trade name: BELSORP-mini, manufactured by MicrotracBEL Corp.) by means of a BET method in which nitrogen ($N_2$) adsorption was used. The results are shown in Table 1.

(3) Average Primary Particle Diameter

The electrode material for a lithium-ion rechargeable battery was observed using a scanning electron microscope (SEM) (trade name: S-4800, manufactured by Hitachi High-Technologies Corporation), and the average primary particle diameter of the electrode material for a lithium-ion rechargeable battery of each of the examples and the comparative examples was obtained from the obtained scanning electron microscopic images. The evaluation results are shown in Table 1.

Chemical Li Deintercalation

The electrode material for a lithium-ion rechargeable battery of each of the examples and the comparative examples was mixed with a solution obtained by adding $NOBF_4$ as an oxidant to acetonitrile, and the components were stirred together for 15 hours, thereby chemically deintercalating Li.

The additive amount of $NOBF_4$ was set to an amount that was approximately 1.1 times the amount of Li deintercalated.

After the Li deintercation treatment, solid and liquid were separated from each other by means of filtration, the electrode material was washed with acetone and then was dried in a vacuum dryer at a temperature of 50° C. for 24 hours, thereby producing a sample.

Evaluation of Electrode Material for Lithium-Ion Rechargeable Battery and Electrode Material from which Li is Chemically Deintercalated (1) X-Ray Diffraction The electrode material for a lithium-ion rechargeable battery of each of the examples and the comparative examples was identified using an X-ray diffraction apparatus (trade name: X'Pert PRO MPS, manufactured by PANalytical, radiation source: CuKα).

As a result, in the electrode material for a lithium-ion rechargeable battery of Example 1, it was confirmed that single-phase $LiFe_{0.1898}Mn_{0.80}Mg_{0.01}Ca_{0.0002}PO_4$ was generated. In addition, in the electrode material for a lithium-ion rechargeable battery of Example 2, it was confirmed that single phase $LiFe_{0.1848}Mn_{0.80}Mg_{0.01}Ca_{0.0002}Co_{0.005}PO_4$ was generated. In addition, in the electrode material for a lithium-ion rechargeable battery of Comparative Example 1, it was confirmed that single-phase $LiFe_{0.20}Mn_{0.80}PO_4$ was generated. In addition, in the electrode material for a lithium-ion rechargeable battery of Comparative Example 2, it was confirmed that single-phase $LiFe_{0.19}Mn_{0.80}Mg_{0.01}PO_4$ was generated. In addition, in the electrode material for a lithium-ion rechargeable battery of Example 3, it was confirmed that single-phase $LiFe_{0.0798}Mn_{0.80}Mg_{0.12}Ca_{0.0002}PO_4$ was generated. In addition, in the electrode material for a lithium-ion rechargeable battery of Example 4, it was confirmed that single-phase $LiFe_{0.1998}Mn_{0.80}Ca_{0.0002}PO_4$ was generated.

In addition, the crystal lattice constants and the lattice volumes were computed from the X-ray diffraction patterns of these electrode materials for a lithium-ion rechargeable battery. The results are shown in Table 1.

(2) Evaluation of Electrode Material from which Li is Chemically Deintercalated

The electrode material for a lithium-ion rechargeable battery of each of the examples and the comparative examples from which Li was chemically deintercalated was evaluated using an X-ray diffraction apparatus (trade name: X'Pert PRO MPS, manufactured by PANalytical, radiation source: CuKα). In addition, the crystal lattice constants and the lattice volumes were computed from the X-ray diffraction patterns of these electrode materials for a lithium-ion rechargeable battery. The results are shown in Table 1.

Production of Lithium-Ion Rechargeable Battery

The electrode material of each of the examples and the comparative examples, polyvinylidene fluoride (PVdF) as a binding agent, and acetylene black (AB) as a conductive auxiliary agent were added to N-methyl-2-pyrrolidone (NMP) which was a solvent so that the mass ratio therebetween in a paste reached electrode material:AB:PVdF=90:5:5, and the components were mixed together, thereby preparing an electrode material paste for a lithium-ion rechargeable battery.

Next, the electrode material paste for a lithium-ion rechargeable battery was applied to a surface of a 30 μm-thick aluminum foil (current collector) so as to form a coating, and the coating was dried, thereby forming an electrode mixture layer on the surface of the aluminum foil. After that, the electrode mixture layer was pressed under a predetermined pressure so as to obtain a predetermined density, thereby producing a cathode for a lithium-ion rechargeable battery of each of the examples and the comparative examples.

Next, a circular plate having a diameter of 16 mm was produced from the cathode for a lithium-ion rechargeable battery using a shaping machine by means of punching, was dried in a vacuum, and then a lithium-ion rechargeable battery of each of the examples and the comparative examples was produced using a stainless steel (SUS) 2016 coil cell in a dried argon atmosphere.

Metallic lithium was used as an anode, a porous polypropylene film was used as a separator, and a $LiPF_6$ solution (1 M) was used as an electrolyte. As the $LiPF_6$ solution, a solution obtained by mixing ethylene carbonate and ethyl methyl carbonate so that the volume ratio therebetween reached 1:1 was used.

Evaluation of Lithium-Ion Rechargeable Battery (1) Battery Characteristics

The battery characteristics of the lithium-ion rechargeable battery were evaluated. At an environmental temperature of 25° C. or 0° C., constant electric current charging was carried out at an electric current value of 0.1 CA until the voltage of the cathode reached 4.3 V relative to the equilibrium voltage of Li, and, once the voltage reached 4.3 V, constant voltage charging was carried out until the electric current value reached 0.01 CA. In a case in which the charging was carried out at 0° C., the discharge capacity was decreased more than in a case in which the charging was carried out at 25° C., the battery was not sufficiently charged, and in the subsequent discharging, it was not possible to obtain a discharge capacity greater than the charge capacity.

After that, the lithium-ion rechargeable battery was rested for one minute, and then, at an environmental temperature of 25° C. or 0° C., constant electric current discharging of 0.1 CA was carried out until the voltage of the cathode reached 2.0 V relative to the equilibrium voltage of Li. The discharge capacity and the mass energy density (Wh/kg) of the lithium-ion rechargeable battery were evaluated by means of this test. The mass energy density is expressed as the integrated value of the discharge capacity and the discharge voltage and is a value corresponding to an area obtained by plotting the discharge voltage in the vertical axis and the discharge capacity in the horizontal axis. In a case in which the mass energy density is measured at 0° C., the discharge capacity and the discharge voltage are decreased more than in a case in which the mass energy density is measured at 25° C., and the mass energy density is decreased. Here, for example, when the discharge voltage is significantly decreased, the mass energy density is significantly decreased even when the discharge capacity is slightly decreased. When an electrode material in which a change in the lattice volume is suppressed as obtained in the present embodiment is used, a sufficient discharge capacity can be ensured even in a 0° C. discharge, and it is possible to suppress a decrease in both the subsequent discharge capacity and the subsequent discharge voltage. As a result, it becomes possible to suppress a decrease in the mass energy density. The results are shown in Table 1.

From the results in Table 1, it was found that, in the electrode materials for a lithium-ion rechargeable battery of Examples 1 and 2, the change ratio (V1−V2)/V1 was in a range of 0.06 to 0.09, the ratio L/R of the value L of the charge capacity of $LiFe_xMn_{1-w-x-y-z}Mg_yCa_zA_wPO_4$ at a current density of 0.1 CA, which was measured at 0° C., to the value R of the charge capacity of $LiFe_xMn_{1-w-x-y-z}Mg_yCa_zA_wPO_4$ at a current density of 0.1 CA, which was measured at 25° C., was in a range of 0.825 to 0.996, and the charge capacity at a current density of 0.1 CA, which was measured at 0° C., was 120 mAh/g or more. On the other hand, it was found that, in the electrode materials for a lithium-ion rechargeable battery of Comparative Examples 1 to 4, the change ratio (V1−V2)/V1 was less than 0.06 and more than 0.09, the ratio L/R of the value L of the charge capacity of $LiFe_xMn_{1-w-x-y-z}Mg_yCa_zA_wPO_4$ at a current density of 0.1 CA, which was measured at 0° C., to the value R of the charge capacity of $LiFe_xMn_{1-w-x-y-z}Mg_yCa_zA_wPO_4$ at a current density of 0.1 CA, which was measured at 25° C.,

TABLE 1

|  |  | Specific surface area [m²/g] | Amount of C [% by mass] | Lattice constant of $LiFe_xMn_{1-w-x-y-z}Mg_yCa_zA_wPO_4$ [angstrom] | | | Lattice volume V1 [angstrom³] |
|---|---|---|---|---|---|---|---|
|  |  |  |  | a | b | c |  |
| Example 1 | $LiFe_{0.1898}Mn_{0.80}Mg_{0.01}Ca_{0.0002}PO_4$ | 12.4 | 1.21 | 10.4075 | 6.0465 | 4.7253 | 297.36 |
| Example 2 | $LiFe_{0.1848}Mn_{0.80}Mg_{0.01}Ca_{0.0002}Co_{0.005}PO_4$ | 10.9 | 1.07 | 10.3912 | 6.0419 | 4.7093 | 295.66 |
| Comparative Example 1 | $LiFe_{0.2}Mn_{0.8}PO_4$ | 11.8 | 1.10 | 10.4045 | 6.0421 | 4.7194 | 296.69 |
| Comparative Example 2 | $LiFe_{0.19}Mn_{0.80}Mg_{0.01}PO_4$ | 12.8 | 1.18 | 10.4022 | 6.0412 | 4.7175 | 296.46 |
| Comparative Example 3 | $LiFe_{0.0789}Mn_{0.80}Mg_{0.12}Ca_{0.0002}PO_4$ | 11.6 | 1.05 | 10.3895 | 6.0407 | 4.7149 | 295.91 |
| Comparative Example 4 | $LiFe_{0.1998}Mn_{0.80}Ca_{0.0002}PO_4$ | 12.1 | 1.28 | 10.4154 | 6.0426 | 4.7276 | 297.53 |

|  | Lattice constant of $Fe_xMn_{1-w-x-y-z}Mg_yCa_zA_wPO_4$ [angstrom] | | | Lattice volume V2 [angstrom³] | (V1-V2)/V1 [−] | Discharge capacity [mAh/g] | | L/R [%] | 0° C. discharge capacity [mAh/g] |
|---|---|---|---|---|---|---|---|---|---|
|  | a | b | c |  |  | 25° C. | 0° C. |  |  |
| Example 1 | 9.8488 | 5.7934 | 4.7864 | 273.10 | 0.082 | 154.0 | 133.1 | 86.4 | 127.8 |
| Example 2 | 9.9132 | 5.7990 | 4.7742 | 274.45 | 0.072 | 149.8 | 131.2 | 87.6 | 129.4 |
| Comparative Example 1 | 9.7719 | 5.7547 | 4.7718 | 268.34 | 0.096 | 150.5 | 111.9 | 74.9 | 103.2 |
| Comparative Example 2 | 9.7705 | 5.7556 | 4.7565 | 267.49 | 0.098 | 151.9 | 118.3 | 77.9 | 113.7 |
| Comparative Example 3 | 9.9459 | 5.8575 | 4.8054 | 279.95 | 0.054 | 135.2 | 96.3 | 71.2 | 85.8 |
| Comparative Example 4 | 9.7782 | 5.7589 | 4.7867 | 269.55 | 0.094 | 147.6 | 121.2 | 82.1 | 115.8 | was less than 0.825 and more than 0.996, or the charge capacity at a current density of 0.1 CA, which was measured at 0° C., was less than 120 mAh/g.

INDUSTRIAL APPLICABILITY

Since the electrode material for a lithium-ion rechargeable battery of the present invention includes particles which are made of $LiFe_xMn_{1-w-x-y-z}Mg_yCa_zA_wPO_4$ (here, A represents at least one element selected from Co, Ni, Zn, Al, and Ga, $0 \leq w = 0.05$, $0.05 \leq x \leq 0.35$, $0.01 \leq y \leq 0.10$, and $0.0001 \leq z \leq 0.002$), have an orthorhombic crystal structure, and have a space group of Pmna, and the change ratio (V1−V2)/V1 between the lattice volume V1 of $LiFe_xMn_{1-w-x-y-z}Mg_yCa_zA_wPO_4$ and the lattice volume V2 of $Fe_xMn_{1-w-x-y-z}Mg_yCa_zA_wPO_4$ obtained by chemically deintercalating Li from $LiFe_xMn_{1-w-x-y-z}Mg_yCa_zA_wPO_4$ is in a range of 0.06 to 0.09, a lithium-ion rechargeable battery including an electrode for a lithium-ion rechargeable battery produced using this electrode material for a lithium-ion rechargeable battery has a high discharge capacity and a high energy density at a low temperature or in a high-speed charge and discharge, and thus the lithium-ion rechargeable battery can also be applied to a next-generation rechargeable battery from which a higher voltage, a higher energy density, higher load characteristics, and higher-speed charge and discharge characteristics are expected, and in the case of a next-generation rechargeable battery, the effects are extremely strong.

The invention claimed is:

1. An electrode material for a lithium-ion rechargeable battery comprising:

particles which are made of $LiFe_xMn_{1-w-x-y-z}Mg_yCa_zA_wPO_4$, in which A represents at least one element selected from Co, Ni, Zn, Al, and Ga, $0 \leq w \leq 0.05$, $0.05 \leq x \leq 0.35$, $0.01 \leq y \leq 0.05$, and $0.0001 \leq z \leq 0.002$, have an orthorhombic crystal structure, and have a space group of Pmna, a change ratio (V1−V2)/V1 between a lattice volume V1 of $LiFe_xMn_{1-w-x-y-z}Mg_yCa_zA_wPO_4$ and a lattice volume V2 of $Fe_xMn_{1-w-x-y-z}Mg_yCa_zA_wPO_4$ obtained by chemically oxidizing $Fe_xMn_{1-w-x-y-z}Mg_yCa_zA_w$ thereby detaching Li from the $LiFe_xMn_{1-w-x-y-z}Mg_yCa_zA_wPO_4$ being in a range of 0.06 to 0.09; and a ratio L/R of a value L of a charge capacity of the $LiFe_xMn_{1-w-x-y-z}Mg_yCa_zA_wPO_4$ at an electric current density of 0.1 CA measured at 0° C., to a value R of the charge capacity of the $LiFe_xMn_{1-w-x-y-z}Mg_yCa_zA_wPO_4$ at an electric current density of 0.1 CA measured at 25° C. being in a range of 0.825 to 0.996.

2. The electrode material for a lithium-ion rechargeable battery according to claim 1,
wherein a surface of the $LiFe_xMn_{1-w-x-y-z}Mg_yCa_zA_wPO_4$ is coated with a carbonaceous film.

3. The electrode material for a lithium-ion rechargeable battery according to claim 1,
wherein a discharge capacity of the $LiFe_xMn_{1-w-x-y-z}Mg_yCa_zA_wPO_4$ at an electric current density of 0.1 CA measured at 0° C. is 120 mAh/g or more.

4. The electrode material for a lithium-ion rechargeable battery according to claim 1,
wherein the $LiFe_xMn_{1-w-x-y-z}Mg_yCa_zA_wPO_4$ is oxidized in a solution in which an oxidizing agent is added to a non-aqueous polar solvent.

* * * * *